INVENTORS
FREDERICK B. BROCKHUES
WILHELM MUHM
BY
Erich M. H. Radde
AGENT

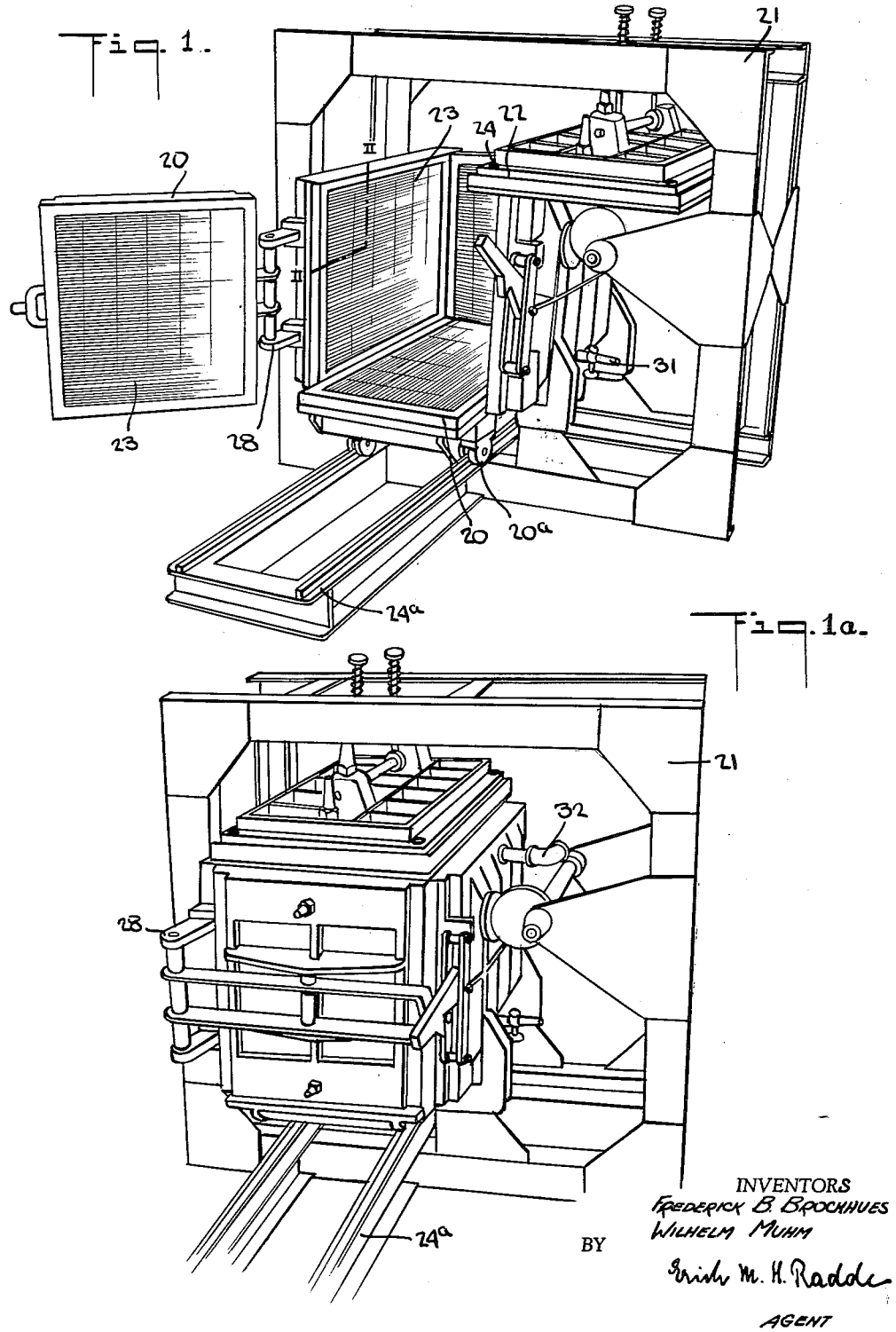

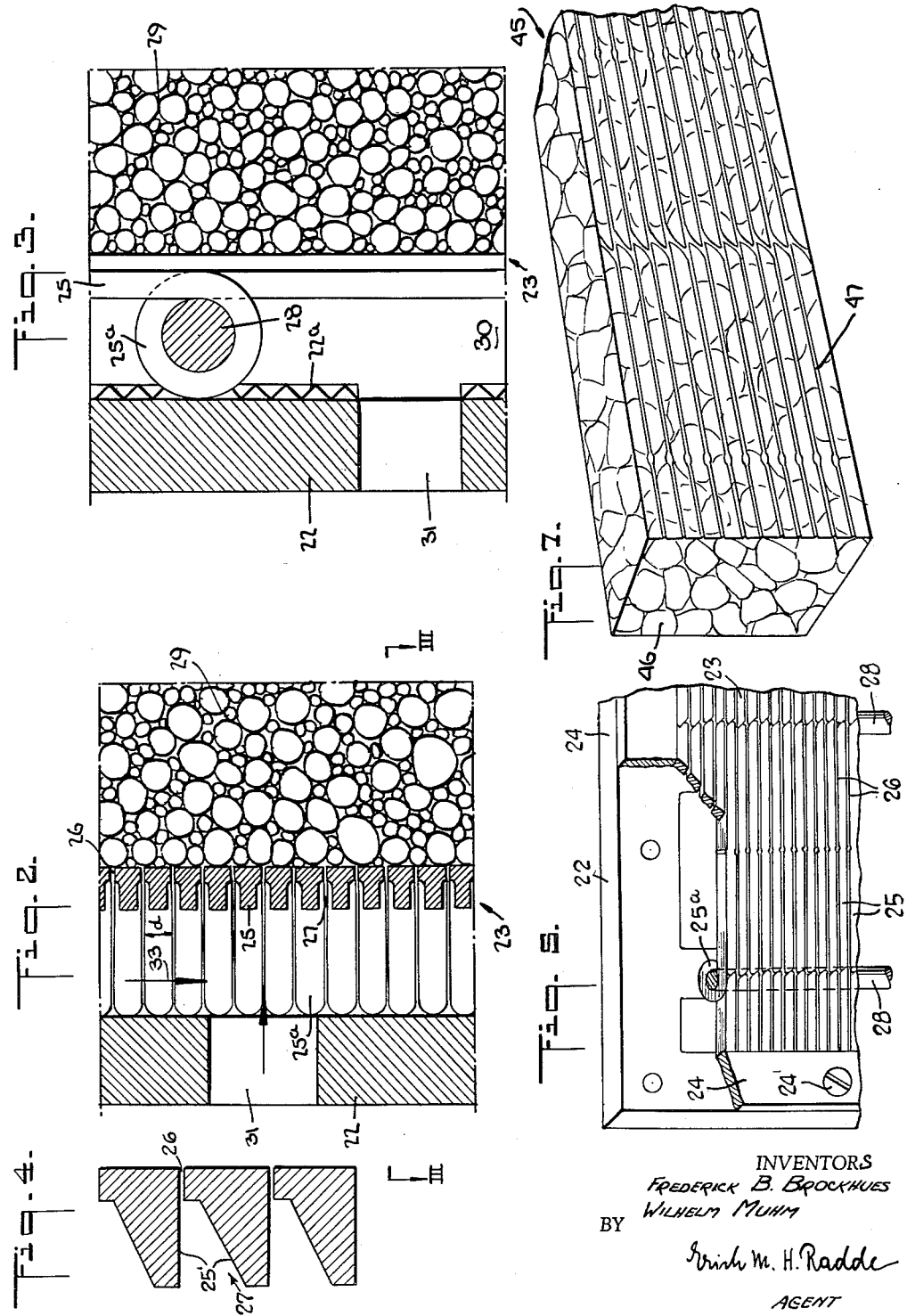

United States Patent Office 3,042,973
Patented July 10, 1962

3,042,973
PROCESS OF MANUFACTURING A SHAPED BODY OF POROUS POLYSTYRENE FOAM OF LOW DENSITY
Frederick B. Brockhues, Haus 442, Vaduz, Liechtenstein, and Wilhelm Muhm, Humboldstrasse 299, Wiesbaden, Germany
Filed June 24, 1957, Ser. No. 667,434
Claims priority, application Germany June 25, 1956
3 Claims. (Cl. 18—48)

The present invention relates to the manufacture of porous shaped polystyrene bodies of low density.

Shaped polystyrene foam bodies are usually prepared from pre-expanded but still further expandable polystyrene in steel or aluminum molds whose wide walls are lined with perforated or otherwise apertured sheet metal. The diameter of the holes in such sheet metal is about 1 mm. to about 2 mm. and the distances of the holes from each other are between about 10 mm. and about 20 mm. Molding of the loose mass of polystyrene particles to form the molded article is effected by introducing hot steam having a temperature of about 110° C. to about 115° C. The steam flows through the perforated or otherwise apertured sheet metal lining into the mass of particles from box- or bell-shaped steam conduit chambers or jackets which are arranged at the wide side-walls of the mold. Penetration of the steam through the apertures of the sheet metal lining to each individual particle of the pre-expanded polystyrene mass and distribution thereof within said mass proceeds quite rapidly and without difficulty if the layer of particles to be penetrated by the steam is not too thick and the hollow spaces within said layer are not too small.

However, if molds are used wherein the perforated or otherwise apertured sheet metal linings are more than 25 cm. apart from each other, or if the molds are filled with fine-grained polystyrene or even with polystyrene in the form of very small pearls, which are usually employed because of their simpler manufacture and cheaper price, rapid, uniform, and sufficient supply of steam to the individual particles, particularly those in the interior, is difficult. It often happens that the steam cannot penetrate quickly enough to the interior of the particle mass because its flow is impeded by premature welding together of particles near the apertured or perforated sheet metal linings. Consequently, only the exterior of the shaped article is welded to a certain depth and is converted into a solid body while loose polystyrene particles which are not fully expanded are still present in the interior of the article.

It is, therefore, important to provide means for directing the steam rapidly and in sufficient amounts to all the particles of the mass because the particles will expand and weld together with their adjacent particles to form a compact body only if each particle is surrounded by steam. Accordingly, it has been proposed to improve the steam supply by mounting slot jets in the sheet metal lining. Slot jets used to exhaust core boxes in foundries or casting plants assure quicker and more uniform steam supply than the holes in the sheet metal linings but they have the disadvantage of becoming easily loose in and even completely detached from the linings. Furthermore, large metal sheets lose their planar form and become deformed when slot jets are mounted therein.

After the pre-expanded polystyrene particles have been molded to form the shaped article, the article must be cooled to harden the pore walls of the particles which walls were softened during molding, and to solidify the shaped article. Immediate cooling with water can be effected when large particles are used in whose pores there remains, after molding, a certain amount of expanded expanding agent which exerts a pressure on the soft and elastic walls of the pores. However, shaped articles of fine-grained or fine-pearled polystyrene cannot be cooled with water immediately after molding because the gas or air pressure in the pores, if any, is not sufficient to equalize the collapse or shrinkage of the walls of the pores which occurs during rapid water cooling. Therefore, a shaped body made of fine-grained or fine-pearled expanded polystyrene, which is cooled too soon with water, shrinks and is deformed. Slow cooling in the mold or by blowing cold air thereupon has been used to prevent this shrinkage. Such a cooling process takes, of course, much more time than water cooling and, therefore, decreases the efficiency of the mold.

It is an object of the present invention to avoid the above and other disadvantages and to manufacture large shaped bodies of porous polystyrene foam of low density in an economic operation.

According to the present invention, expandable polystyrene particles are placed into a mold having a plurality of adjoining walls and since the shaped bodies are to have a minimum thickness of 25 cm., opposite walls of the mold are spaced apart more than 25 cm. The mold walls have closely spaced slot-like openings and through the openings of only some of the walls steam is conducted into contact with the polystyrene particles to expand the same in the mold while the expanding particles are retained at closely spaced mold zones across the entire surface of the mold, the mold zones defining the slot-like steam inlet openings therebetween. The steam conducted into the steam inlet openings pushes moisture through the openings in the remaining mold walls and drives the moisture out of the resultant low-density porous shaped body of polystyrene foam which has thin reinforcing lines corresponding to the slot-like wall openings between the mold retaining zones. After expansion of the polystyrene particles in the mold is completed, a stream of cold water is passed past the slot-like openings and at a distance therefrom so as to cool and moisten the air in the openings and to cool the shaped body through the openings by convection.

According to a preferred embodiment, the steam inlet openings area covers from 300 sq. cm. to 900 sq. cm. per sq. m. of the wall area defining the openings.

Also preferably, the steam is conducted into the mold through one wall only.

The above and other objects, features, and advantages of the present invention will be more fully explained in the following detailed description of a preferred embodiment thereof, taken in conjunction with the accompanying schematic drawings. In said drawings FIGS. 1, 1a, and 1b are perspective views of a mold for forming blocks of the pre-expanded particulate polystyrene;

FIG. 2 is a longitudinal section of the mold wall along line II—II of FIG. 1;

FIG. 3 is a horizontal section of the mold wall along line III—III of FIG. 2;

FIG. 4 is a longitudinal section of the sieve of FIG. 2, showing a different cross section of the sieve wires; and FIG. 5 is a perspective view of a mold wall as shown in FIG. 2;

FIG. 7 shows the finished polystyrene foam article with its surface ribs.

Figure 1B:
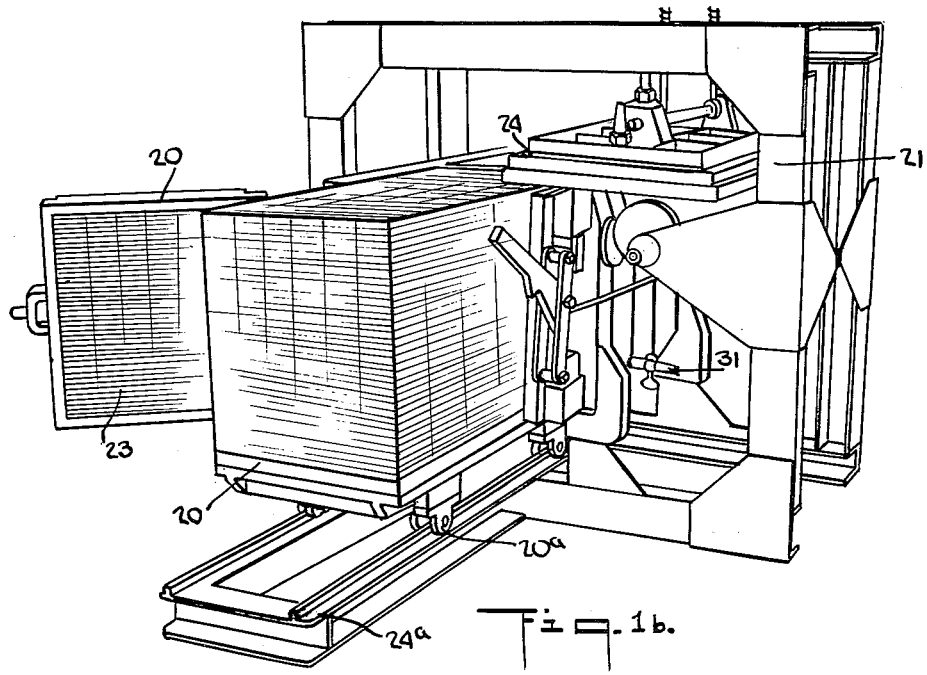

Referring now to the drawing, there is shown a mold for producing shaped bodies, for instance blocks, of polystyrene foam from pre-expanded particulate polystyrene.

As shown, the six mold walls 20 are demountably held in the mold frame 21. Since the mold wall mounting in the frame is conventional, it will not be further described, succeeding stages of assembly being illustrated in FIGS. 1 and 1a, the latter figure showing the mold fully closed and ready for the molding operation.

According to the present invention, the mold walls are double-walled structures comprising the outer metal plate 22 and the inner slotted sieve 23, the two being bolted together at 24' or otherwise suitably secured together. As shown, sieve 23 is mounted on frame 24 and consists of a plurality of parallel profiled wires or rods 25 spaced apart so as to leave slots 26 of a width of about 0.05 mm. to about 1.0 mm. therebetween. Slots of a width of 0.08 mm. to 0.22 mm. are preferred. The rods may have a T-shaped cross section such as shown in FIG. 2 to leave a recess 27 between two adjacent rods as an entrance chamber to the slot 26. Alternatively, the rods 25' may have the cross section illustrated in FIG. 4 to leave wedge-shaped entrance chambers 27' in front of slots 26'.

A plurality of support posts 28 are mounted in the frame 24 and the rods 25 are coiled about them at 25a so as to support and reinforce the sieve structure consisting of the closely spaced rods. The thickness $d$ of the rods is between about 2 mm. and about 8 mm. and preferably between about 3 mm. to about 4 mm.

The thickness of the rods and the width of the slots is about the same in the inner drum 2 of the pre-expanding apparatus.

FIG. 1 shows two side walls 20 of the mold supported in the mold frame 21 while the bottom wall is rolled into position on track 24a by rollers or wheels 20a. The front wall is hinged to one of the side walls at 28.

FIG. 1 illustrates the closed and clamped together mold ready for the molding operation.

When the particulate pre-expanded polystyrene 29 is introduced into the mold and the mold is clamped together, steam is introduced under pressure in the space 30 between sieve 23 and pressure walls 20 by means of steam inlet 31. Obviously, the steam penetrates into the mass 29 much faster and more uniformly through the closely spaced slots 26 than it would through a perforated wall or through slot jets. In perforated linings of the prior art, holes of a diameter of 1 mm. to 2 mm. were spaced apart a distance of at least 10 mm. to 30 mm. in order to avoid undue weakening of the wall. Thus, the perforations covered about 30 sq. cm. per sq. m. of surface. In contrast to this, slots of 0.2 mm. width provided between adjacent wires of the sieve of the invention cover from 300 sq. cm. to 900 sq. cm., preferably between 500 sq. cm. and 600 sq. cm. per sq. m. of surface depending on the thickness of the profiled wires or rods 25.

Obviously, the steam can penetrate into the particles mass much faster and more uniformly through the slotted sieve than through individual holes or slot jets which, to avoid weakening of the sheet metal lining, must be spaced at distances of at least 30 mm. Furthermore, mold walls with apertured sheet metal linings or slot jets with their required steam jackets are much more time-consuming and expensive to make than mold walls with slot sieve linings. Slotted sieves, which do not require special steam jackets, may be used in commercially available forms and, therefore, make manufacture more economical.

When expandable polystyrene is molded in molds with perforated sheet metal linings, it expands into the holes of the lining and the resulting shaped body has corresponding surface protrusions or warts.

When vertical molds are used, which have the advantage of being easier to charge and wherefrom the shaped body can be vertically removed, such protrusions must be sheared off during removal, thus making removal of the shaped body from the apertured linings more difficult. This is further aggravated by the fact that the moist and smooth shaped body strongly adheres to the moist and smooth lining, which further renders difficult removal of the expanded plastic body from the mold.

Since the surface of slotted sieves is considerably smaller than that of perforated linings and since adhesion thereto is, therefore, correspondingly smaller, the shaped body can be removed from vertical molds with such slotted sieves without difficulty. Removal of the shaped body is further facilitated by the fact that the expanding polystyrene enters into the very small slots of the sieve only for a minute distance and the corresponding surface lines cannot be anchored therein.

Some of the most important advantages of the apparatus provided with slotted sieves are obtained, however, during cooling. When standing or vertical molds with slotted sieve linings are cooled by letting water run or trickle down between the sheet metal linings and the slotted sieves (arrow 33, FIG. 2), the cooling time is considerably reduced. The water trickling down the mold wall and removing the heat emanating from the mold is not in contact with the shaped body itself but is separated therefrom by the sieve providing convection cooling of polystyrene foam 29. In this manner, the downwardly trickling water cools the air in the space between the mold walls and heat emanating from the interior of the resin foam is convection-cooled by the air. This is possible only with slotted sieve elements which provide sufficient apertured area for the heat to escape from the interior. This avoids the rapid quenching of the prior art which used direct rather than convection cooling. This is particularly important for shaped foam bodies of low density. The warm, soft, and sensitive pore walls of the exterior particles of the shaped body thus harden quickly without shrinking. As soon as the polystyrene at the surface of the shaped body has solidified to a sufficient degree, streaming water may be used for further cooling without any danger of shrinkage or deformation of the shaped body. To increase the cooling surface, a wafer-shaped insert 22a may be arranged between the outer mold wall and the sieve (see FIGS. 3 and 6), thus, the outer wall will remain warm while the cooling effect is directed inwardly. The lower edge of the sieve may have a wide slot 44 to permit condensate and trickling water to escape.

The resultant polystyrene foam article, cut from the shaped body produced in the above-described mold, is illustrated in FIG. 7. As shown, the plastic block 45 is provided with its characteristic outer surface lines 47 which correspond to the longitudinal spaces 26 between the rods 25 of the sieve. The surface lines characterize the articles produced according to the present invention. Also shown are the polystyrene bubbles 46 of which the foam article is composed.

During molding, when the polystyrene mass 29 is foamed, the mold walls must be warm, i.e. they must be heated so that the steam or condensate precipitated from the resin mass in the mold during its foaming may escape through the multiple openings of the slotted sieve.

In accordance with a preferred embodiment of the present invention, steam is supplied to the mold only from one side, preferably the side with the largest surface. This has the effect of pushing the condensate and any moisture present in the pre-expanded particles ahead of the steam so that the condensate and the moisture may escape from the opposite side of the mold. This procedure reduces the moisture content of the shaped body to a minimum and thereby increases its insulating capacity. If steam is supplied to the resin mass in the mold from two opposite sides or from all sides under equal pressure, no condensate and moisture can escape through the sieve openings.

Rather, the condensate and moisture would be collected in the center of the mass, lowering the temperature and making the fusion more difficult, thus leading to faulty molding.

With the known perforated linings, steam must be supplied from two sides because there would otherwise not be enough steam to cause satisfactory foaming. This is so because, as mentioned hereinabove, slotted sieves according to the present invention provide a considerably larger steam access area through their many slots, one side of a slotted sieve exceeding all sides of a perforated sheet metal lining in apertured area.

In a perforated metal sheet, the number of perforations is limited by the requirements for the rigidity of the sheet. In contrast thereto, the rigidity of a slotted sieve may be determined by the spacing of loops 25a rather than the distance between rods or wires. Thus, it is never possible to obtain the favorable ratio between total surface and perforations in a perforated metal sheet as in a slotted sieve without endangering the rigidity of the metal sheet.

The molded body of the present invention has a surface layer with parallel reinforcing lines minutely protruding from the surface, said layer being denser than the interior of the body. This has the advantage that the molded body may be removed from the mold even if its interior is still soft whereupon it may be hardened in storage. The dense and hard surface layer makes the molded article immediately ready for transportation.

Where conventional cooling of molded bodies took 30 to 40 minutes, cooling of 10–15 minutes is sufficient in the manufacture of the present invention.

The following example serves to illustrate the present invention without, however, limiting the same thereto.

*Example*

4.000 kg. of expandable polystyrene resin sold by Badische Anilin- & Soda-Fabrik A.G. of Ludwigshafen, Germany, under the trade mark "Styropor P" (manufacturer: Badische Anilin- & Soda-Fabrik A.G. of Ludwigshafen (Rhine), Germany), having an apparent density of 600 g. per liter, is pre-expanded and the pre-expanded polystyrene pearls are molded in the illustrated mold being about 2 m. long, about 0.5 m. wide, and about 1 m. high. 18.000 kg. of pre-expanded but still expandable polystyrene pearls of a diameter between about 1 mm. and about 6 mm. and an apparent density of 18 g. per liter are poured into such a mold which is then firmly closed. Steam of a temperature of 110° C. is then introduced into the mold first from one side thereof. The steam passes through the slotted sieve forming one wall thereof and into the mass of pre-expanded polystyrene pearls. Thereby, the steam enters the hollow spaces between the polystyrene particles and causes expansion of the expanding agent of the pre-expanded polystyrene. At the same time it drives the moisture adhering to the polystyrene pearls from the pre-expansion process and any condensate formed on contact of the steam with the comparatively cool polystyrene pearls out through the slotted sieve forming the opposite wall of the mold. Within about 1¾ minutes of steam treatment substantially complete expansion of the polystyrene is effected. The expanded polystyrene fills the mold completely and forms a compact block of light weight cellular polystyrene by pressing and welding together the individual expanded particles. Thereby, the expanding polystyrene, due to the expansion pressure, slightly extends into the slots of the slotted sieve walls and is provided with slightly raised ribs as shown in FIG. 7 on a considerably enlarged scale.

Figure 6:
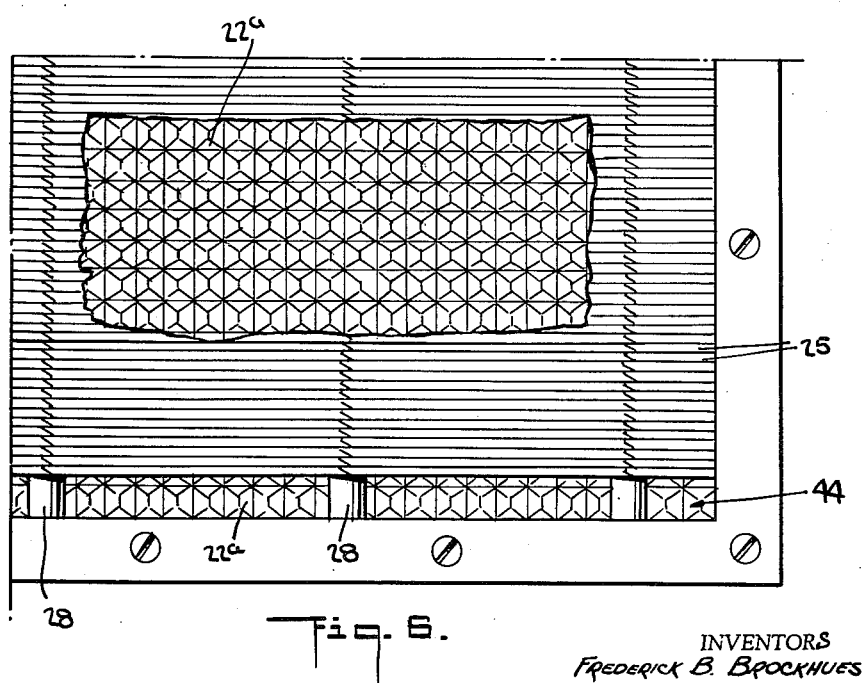
FIG. 6 is a side view of the lower portion of the mold wall shown in FIG. 2, partially broken away to show the wafer-shaped insert between the outer mold wall and the sieve.

As soon as expansion is completed, the steam is turned off and cold water is allowed to flow down the wafer-shaped insert 22a of FIGS. 3 and 6. Thereby, the space between the outer walls 20 and the slotted sieves 23 is cooled rapidly. As a result thereof the expanded polystyrene block is also cooled rapidly due to convection of the heat emanating from its interior through the slots of the sieve. Cooling in this manner ordinarily requires only 14 minutes whereafter the mold may be opened and the block of cellular polystyrene resin of the specific density of 0.018 can be removed and stored to complete cooling thereof.

A body of cellular polystyrene according to the present invention is characterized by having parallel reinforcing ribs on its outer surface. Said ribs are spaced from each other according to the distance of the slots in the slotted sieve walls from each other. The outer layer of such polystyrene bodies has a higher density than the body interior and imparts considerable resistance to handling to the polystyrene body. The impact strength and the bonding strength of molded bodies made according to the present invention and provided with reinforcing ribs are between about 22–25% and about 10–12% higher than of molded bodies as produced heretofore and not having such reinforcing ribs.

While the invention has been described in connection with certain now preferred embodiments, it will be understood that many modifications and variations may occur to the skilled in the art, particularly after benefiting from the present teaching, without departing from the spirit and scope of the present invention as defined in the appended claims.

We claim:

1. A process of manufacturing a shaped body of porous polystyrene foam of low density, said process comprising the steps of placing expandable polystyrene particles into a mold having a plurality of adjoining walls, opposite ones of said walls being spaced apart more than 25 cm., conducting steam through a multiplicity of closely spaced slot-like steam inlet openings in only some of said walls of the mold into contact with the polystyrene particles to expand the same, while retaining the expanding polystyrene particles at closely spaced mold zones across the entire surface of the mold, said mold zones defining the slot-like steam inlet openings therebetween to obtain the low-density porous shaped body of polystyrene foam, having over its entire surface thin reinforcing lines corresponding to the slot-like steam inlet openings between the mold retaining zones, driving moisture out of like ones of said openings in the remaining walls of said mold, the steam conducted into said first named openings pushing said moisture through said last-named openings, and, after expansion of the polystyrene particles is completed, passing a stream of cold water past the slot-like openings and at a distance therfrom so as to cool and moisten the air in said openings and to cool the shaped body through said slot-like openings by convection.

2. A process of manufacturing a shaped body of porous polystyrene foam of low density, said process comprising the steps of placing a mass of partly expanded expandable polystyrene particles into a mold having a plurality of adjoining walls, opposite ones of said walls being spaced apart more than 25 cm., conducting steam through a multiplicity of closely spaced slot-like steam inlet openings in only some of said walls of the mold, passing the steam through the mass into contact with the polystyrene particles until the pre-expanded particles are substantially completely expanded, the steam inlet openings area covering from 300 sq. cm. to 900 sq. cm. per sq. m. of the wall area defining the openings, driving moisture out of like ones of said openings in the remaining walls of said mold, the steam conducted into said first-named openings pushing said moisture through said last-named openings and, after expansion of the polystyrene particles is completed, passing a stream of cold water past the slot-like openings and at a distance therefrom so as to cool the shaped body through said slot-like openings by convection.

3. The process of claim 1, wherein the steam is conducted into the mold through one wall only.

(References on following page)

References Cited in the file of this patent

UNITED STATES PATENTS

| | | |
|---|---|---|
| 951,974 | Snyder | Mar. 10, 1910 |
| 2,331,836 | Hirschberger | Oct. 12, 1943 |
| 2,360,201 | Clayton et al. | Oct. 10, 1944 |
| 2,744,291 | Stastny et al. | May 8, 1956 |
| 2,752,635 | Miller | July 3, 1956 |
| 2,779,062 | Stastny | Jan. 29, 1957 |
| 2,787,809 | Stastny | Apr. 9, 1957 |

OTHER REFERENCES

Koppers booklet, "Dylite-Expandable-Polystyrene," 1954, pages 20–23.